(12) United States Patent
Daily et al.

(10) Patent No.: US 6,198,462 B1
(45) Date of Patent: Mar. 6, 2001

(54) VIRTUAL DISPLAY SCREEN SYSTEM

(75) Inventors: Michael J. Daily, Thousand Oaks; Michael D. Howard, Westlake Village; Kevin R. Martin, Los Angeles; Robert L. Seliger, Ventura, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 08/323,288

(22) Filed: Oct. 14, 1994

(51) Int. Cl.[7] ....................................................... G09G 5/00
(52) U.S. Cl. ................................................................ 345/8
(58) Field of Search .............................. 345/7, 8, 9, 156, 345/119; 348/46, 42, 51, 52, 53; 434/38, 40, 43, 44

(56) References Cited

U.S. PATENT DOCUMENTS 5,148,154 * 9/1992 MacKay et al. ....................... 345/119
5,388,990 * 2/1995 Beckman ................................ 345/8

FOREIGN PATENT DOCUMENTS

2206421 * 1/1989 (GB) ........................................ 345/8

OTHER PUBLICATIONS

Fisher et al, Virtual Environment Display System, ACM Interactive 3D Graphic, Oct. 1986, pp. 1–11.*
Sutherland, A Head–Mounted Three Dimensional Display, Fall Joint Computer Conference, 1968.*

* cited by examiner

Primary Examiner—Chanh Nguyen
(74) Attorney, Agent, or Firm—V. D. Duraiswamy; M. W. Sales

(57) ABSTRACT

Disclosed is a computerized data display system including a computer operating in accord with a window display management system for the display and control of a plurality of data windows on a display screen of a display device. The data windows are displayed on the display screen in a spatial relation corresponding to the field of view seen from a preselected viewing location selected by means of a control signal provided as an input to the computer. A head coupled image display device, coupled to the display screen of the display device, is adapted to display the data windows appearing on the display screen of the display device separately to each eye of a user to create a binocular, stereoscopic virtual screen image to the user that has a virtual screen size independent of the size of the display screen of the display device. A user controlled input position sensor, coupled to the computer, is adapted for generating the position control signal as an input to the computer to selectively change the selected viewing location.

10 Claims, 3 Drawing Sheets

VIRTUAL DISPLAY SCREEN SYSTEM

BACKGROUND OF THE INVENTION

1. Field of the Invention

This invention relates in general to information systems, and, more particularly, to computerized information display systems using hardware and software to make a video display screen appear to be arbitrarily large or two- or three-dimensional to a viewer.

2. Description of the Related Art

Existing workstation environments offer a single two dimensional display surface coupled with sophisticated window systems. The user is constrained to view the stationary display surface and may choose to pan or scroll images around on the physical screen using a software package, for example, X windows. These panning or scrolling packages are controlled typically through the use of a mouse. They do not provide the appearance of a larger display surface and do not alleviate the problem of clutter on a physical display. Resolution is limited to the capability of the physical display, which may be excellent (approximately 2 arc minutes) over a small viewing angle of approximately 30 degrees.

Existing head mounted displays fall into several categories. Low cost, low resolution commercially available Head-mounted stereoscopic Displays (HMDs) have been applied to visualization of computer generated three dimensional virtual worlds but not to sophisticated analysis problems such as air traffic control or tactical situation assessment. High cost, high resolution systems are primarily used for training and flight simulation. They have not been integrated with traditional workstation environments and window systems such as X windows.

A commercial product on the market, WideAngle by TigerSoftware, offers a software solution to the problem of user orientation to a multi-window display. The WideAngle software shows an iconic representation of 9 screens of windows, and allows the user to select which desktop screen to blow up to full size. The implementation is limited to the size of the standard computer monitor. The displays of the other desktops are iconized, that is, the details of each window are hidden. Only the name of the application running in each window is shown in the icon, so if there are 5 documents open in editor windows, all that would show in the overall view would be the name of the editor 5 times. This is not intuitive or useful. The present invention, rather than displaying an icon for each window, shows the actual window at full size. It can be seen with peripheral vision, and the documents read as if they were on the main monitor.

A similar capability for Unix based workstations is built on top of X windows and is called the virtual window manager, tvtwm, and is provided as a sample client for X windows. There is no current interface through the virtual window manager to head tracking or head mounted or head coupled displays, although Hewlett Packard's desktop environment, called Vue, is similar and is being adopted by many UNIX manufacturers as part of the common desktop environment.

OBJECTS AND SUMMARY OF THE INVENTION

Therefore, it is an object of the present invention to provide a computerized information display system using hardware and software to make a video display screen appear to be arbitrarily large or two- or three-dimensional to a viewer.

It is still another object of the present invention to provide a user with a more naturally intuitive method of processing visual and analytical data by presenting such data to the user in a user controlled virtual metaphor freed from the constraints of a physical flat screen display.

Generally, the present invention may be embodied in a computerized data display system which includes a computer operating in accord with a windowing operating system, such as X-Windows, for the display and control of a plurality of data windows on at least one display screen of at least one display device. The data windows are displayed on the display screen in a spatial relation corresponding to the field of view seen from a preselected viewing location selected by means of a control signal provided as an input to the computer. A head coupled image display device, is adapted to display the data windows appearing on each display screen separately to each eye of a user to create a binocular virtual screen image to the user that has a virtual screen size independent of the size of the physical display screen. A sensor that tracks the position of the user's head is coupled to the computer, and is adapted to selectively change the selected viewing location.

By using more than one display source, a stereoscopic virtual image may be presented to the user through the head coupled image display device worn by the user.

In summary then, the present invention is a novel combination of advanced hardware and software that enables an entire new paradigm for user interaction with computers by enlarging the display area to an arbitrary size and providing the means for new modalities of interaction. It is build upon standard X windows software and provides interface capability for use with a head mounted display and head tracker. This capability, as well as the design and construction of novel methods for interaction and visualization with the virtual screen of the present invention has been reduced to practice in a prototype system.

The virtual screen of the present invention has wide ranging applications. Three example applications that can benefit from the virtual screen of the present invention include: command and control products, including air traffic control; earth and science data analysis systems; and training and visualization systems for battlefield management. In addition, there are opportunities for use of the virtual screen of the present invention in many new business areas including medical data visualization.

The invention is described as a combination of hardware and software that will make a video display screen appear to be arbitrarily large. One novel aspect of the invention is the combined use of a window system, physical display hardware in the form of a head-mounted stereoscopic display (HMD), head tracking, and user interface control software to produce a virtual screen of apparently large size. This system also allows the user to place windows or other data in any three dimensional position within the working environment of the head tracking and control software. The virtual screen of the present invention is not limited to a two dimensional or perspective view of data, but may also represent three dimensional stereoscopic imagery in the form of left and right eye views to the user.

If a see-through HMD is used instead of a solid surface HMD, the user's standard computer monitor can be used to show the main window, and "offscreen" windows can be arranged at lower resolution around the computer monitor. This see-through variant still allows the user to place windows in an arbitrarily large virtual display, utilizing the standard computer monitor while allowing the user to see his immediate surroundings. The HMD can be lower resolution since it is used more for organization purposes than for reading. Peripheral windows would be moved onto the main computer monitor for close inspection.

The purpose of the virtual screen is to free the user from the physical limitations of a single display device such as a standard CRT monitor. Traditional display surfaces provide a small window into the actual computer memory through a single CRT with approximately 1K×1K pixel resolution. From a distance of one meter, a typical 19 inch display subtends a visual angle of approximately 26 degrees. Consequently, the user must place multiple windows on the display, one on top of the other, thus obscuring all but the last window used. With the virtual screen, the user has the freedom to place windows in any location in three dimensional space, effectively increasing the visual angle of the display up to 180 degrees or more.

The advantages of the invention are numerous and include:

1. Reducing clutter in window-based analysis systems;
2. Increasing productivity through a more intuitive display interface (using head tracking);
3. Increasing resolution beyond what state of the art physical displays can achieve;
4. Simplifying three dimensional visualization by using the same display interface for two or three dimensional visuals;
5. Building on existing X windows capabilities;
6. Providing incremental modification path to existing displays when coupled with see-through head mounted display technology.

Numerous computer systems and data display systems can benefit from the virtual screen of the present invention. This includes air traffic control (both operations and training), heterogeneous database visualization, multi-media database visualization, tactical situation assessment and command and control, business management and visualization, medical information visualization, distributed interactive simulation, and complex intelligence data analysis. The virtual screen of the present invention will enable more rapid and effective data visualization for complex high volume data sources. A see-through head mounted display would allow the present displays to be used without modification as the focus of attention, where the value added by the invention would be the ability to see a virtual display of windows that are "offscreen" to the monitor, orienting the user to the dataspace.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT

A preferred form of the invention as embodied in a computerized information display systems using hardware and software to make a video display screen appear to be arbitrarily large or two or three dimensional to a viewer, is now described.

Figure 1:
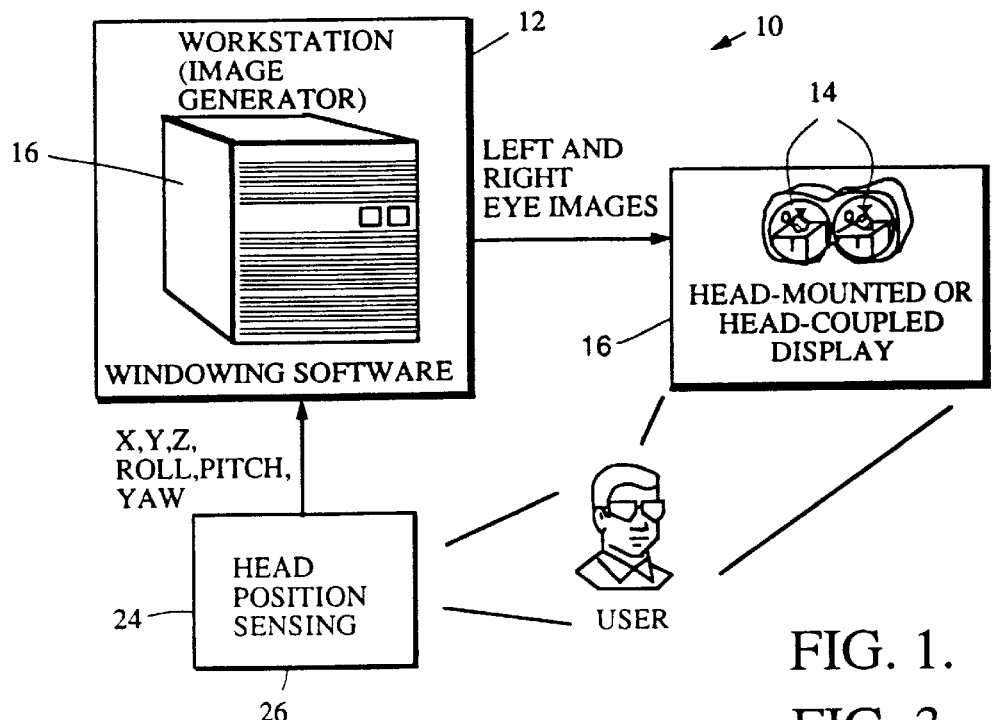
FIG. 1 is a conceptual component block diagram showing the present invention embodied in a virtual screen display system.
Figure 2:
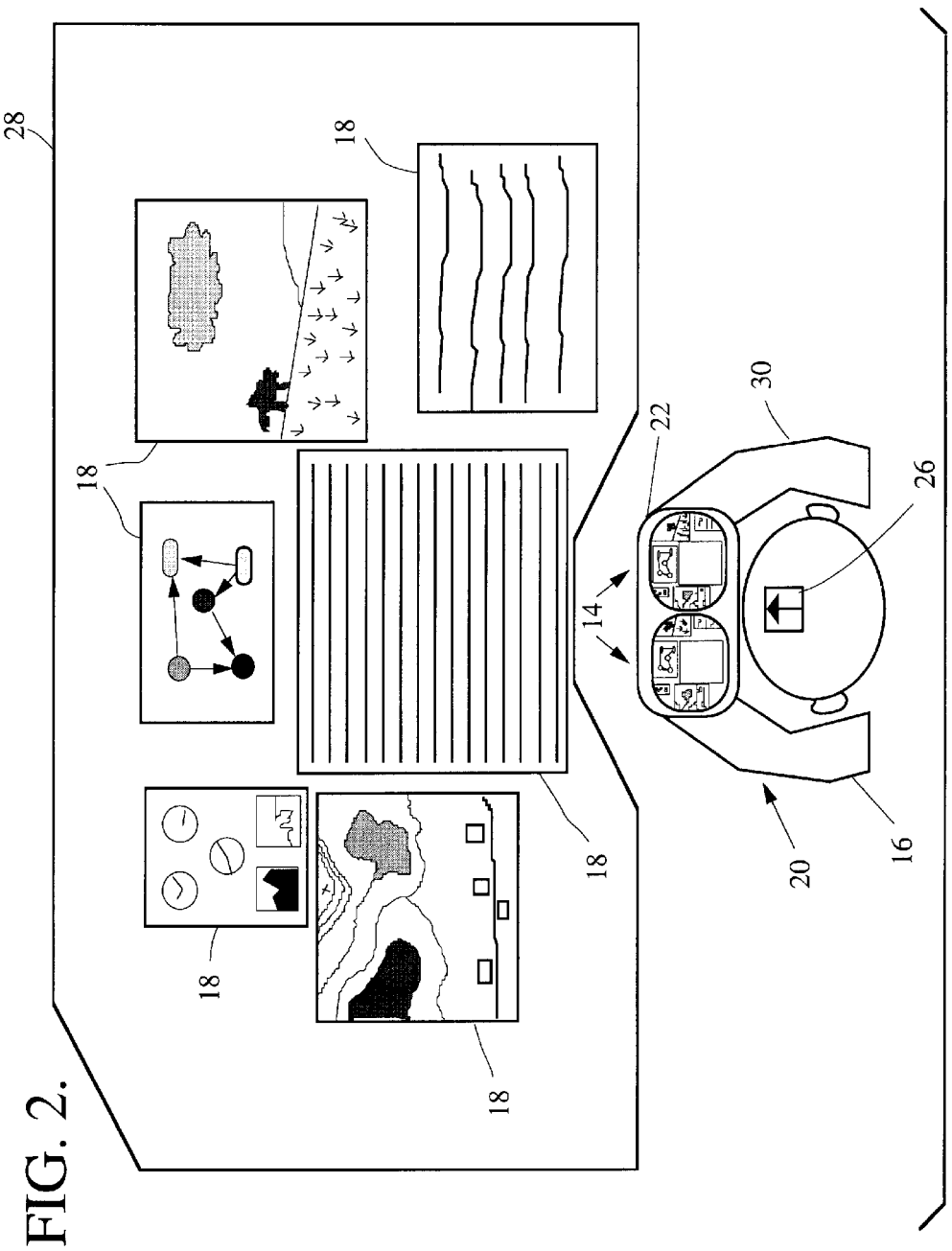
FIG. 2 is an idealized diagram showing one possible virtual screen display embodiment of the present invention.

Generally, the present invention is preferably embodied in a computerized data display system 10 and would include, as shown in FIGS. 1 and 2, a computer or workstation 12 operating under a windowing operating system such as X-Windows, for the display and control of a plurality of data windows 18 on display screens 14 of a display device 16 which may be a head mounted device.

Display device 16 is preferably a head mounted or head coupled display controlled by the workstation 12.

The data windows 18 are displayed on display screens 14 in a spatial relation corresponding to the field of view as seen from a viewing location selected by means of a control signal provided as an input to computer 12 and under the control of the user. The user will then be able to change the viewing point from which the data windows 18 are displayed to correspond with the visual impression derived from the images seen through the head mounted display unit described below.

Workstation 12 preferably contains sufficient memory in either local RAM or other type storage device such as CD-ROM, for retaining the data necessary for the generation and display of data windows 18.

Head mounted display 22 is adapted to display the data windows 18 appearing on display screens 14 of display device 16 separately to each eye of a user to create a binocular, stereoscopic virtual screen image 28 to the user that has a virtual screen size independent of the physical size of display screens 14 of display device 16.

A user controlled input position sensor 24 is coupled to workstation 12 and would preferably be a head coupled low latency head tracking position sensor 26 worn on the user's head as part of the head mounted display and having six degrees of freedom of movement (i.e., x, y, z, roll, pitch and yaw axes), said tracking sensor 24 is adapted for generating position control signal as an input to computer 12 to selectively change the selected viewing location based upon movement of the user's head.

An alternate embodiment of the present invention includes having the head mounted display 22 being a head mounted see-through display as illustrated in FIG. 2.

In a preferred embodiment of the present invention, the virtual screen system generally includes the following hardware and software modules:

1. A head-mounted display (HMD) or head coupled display (HCD), possibly a see through system;
2. A low latency head tracking position sensor;
3. X windows software to enable larger windows and virtual display space than the physical display surface;
4. Software to integrate the head tracking and HMD or HCD with X windows;
5. Software for interacting with data using the head tracker or HMD or HCD;

Additionally, the system may include software for integrating multiple modes of interaction, for example, voice, head/eye tracking, glove input, 3D auditory, etc.

Figure 3:
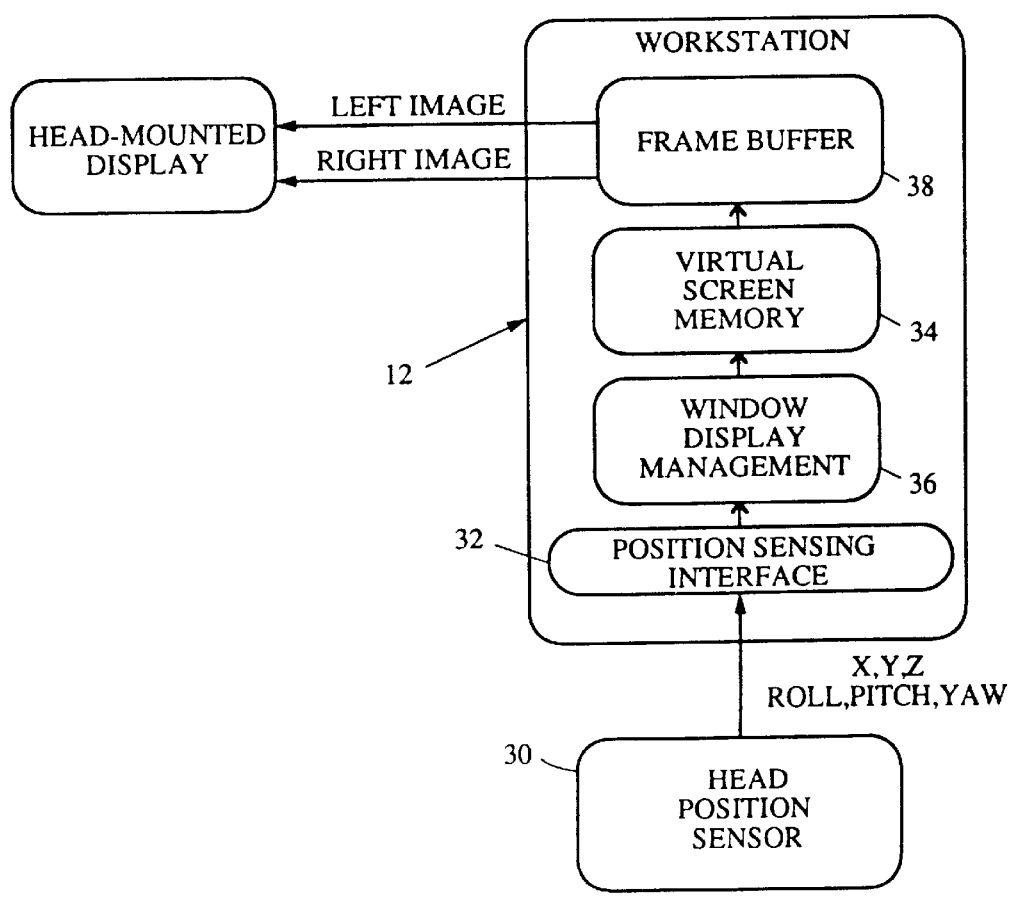
FIG. 3 is an idealized diagram showing a conceptual component block diagram showing the interconnections between the various components forming a virtual screen system embodying the present invention; and, FIG. 4 is a conceptual component block diagram showing the logical interconnections between the various functional components forming a virtual screen system embodying the present invention.
Figure 4:
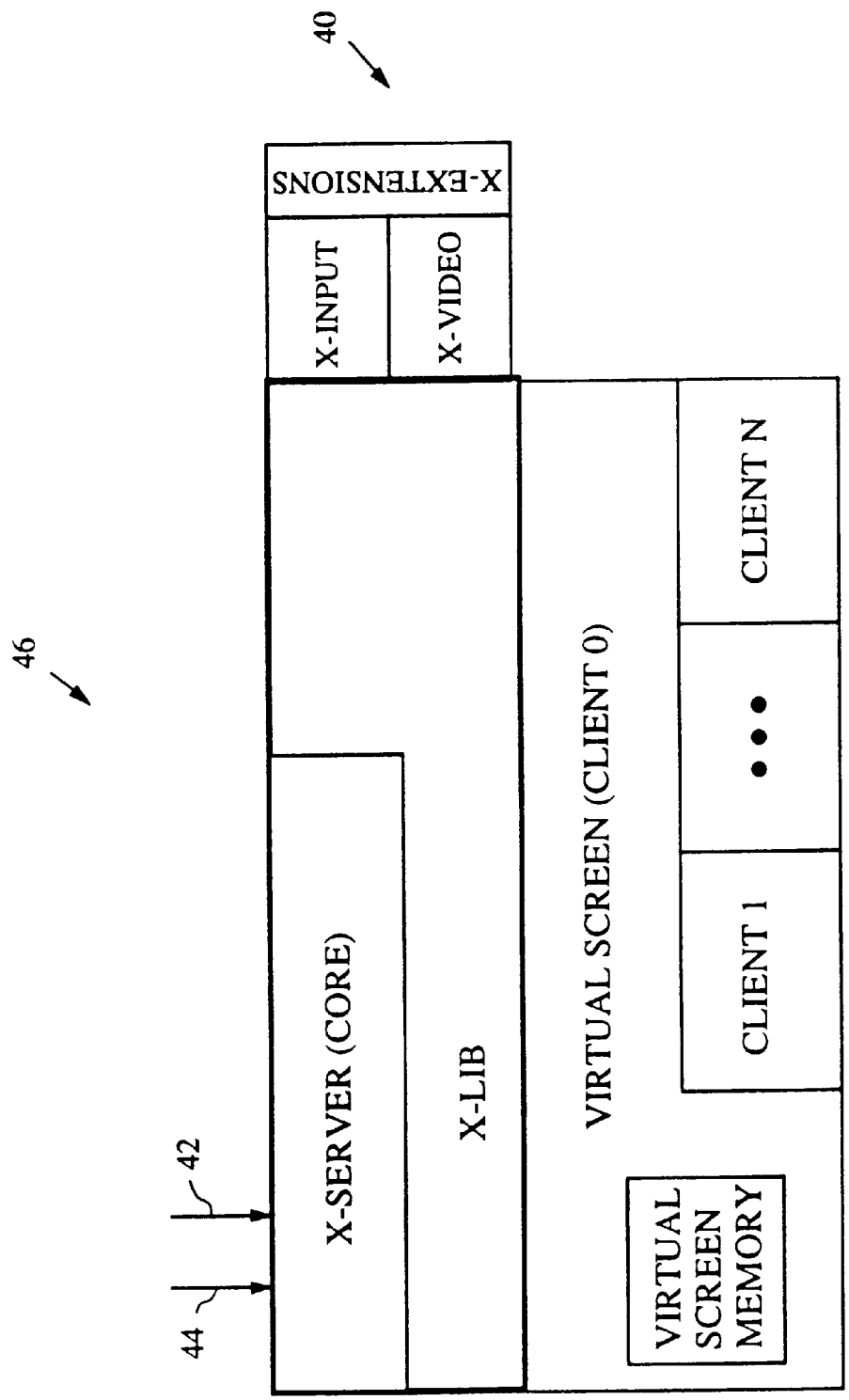

These modules are integrated in a system as shown in the Figures with special emphasis on those details shown in FIGS. 1, 3 and 4.

Images are generated using a standard graphics workstation and displayed using X windows software.

The Virtual Screen display buffer is larger than the physical display surface in each of the left and right images of the HMD, and when the user moves his head, a new portion of the frame buffer is scrolled into the field of view of the HMD. Portions of the frame buffer not currently visible are also redrawn so that small movements are more rapidly updated in the display. The latency in the process from the time the user moves his head to the time the images in the HMD are updated is less than 100 ms.

FIG. 3 shows a block diagram of the modules comprising the Virtual Screen. The head tracker 30 on the HMD 22 sends position (xyz axes) and attitude (roll, pitch, yaw) information describing the user's head position to the workstation 12, which is converted into the proper reference frame in the position sensing interface 32. The gaze direction of the user is converted to an update field of view into the virtual screen memory 34. The window display management module 36 manages all window applications running in the virtual screen and provides a description of the currently displayed portion of the virtual screen memory.

From this information, a new view of the data in the virtual screen memory is constructed and placed in the frame buffer 38. The HMD 22 is fed images from the frame buffer by either of two means: directly from both a left and a right image frame buffer, or by sequentially creating a left, followed by a right image and displaying from a single frame buffer. A 6 degree of freedom input device (one having freedom in six directions of movement) is used to interact with the virtual windows. FIG. 2 shows the virtual display screen concept graphically as well as the major hardware components.

The Virtual Screen software used in the prototype of the present invention was developed under the MIT X11R5 Release of X windows. It is based on the virtual window screen manager, tvtwm, written by Chris Ross of the University of Maryland and Tom LaStrange of Solbourne Computer, Inc., which is provided as a sample client with the aforementioned release and corresponds to the window display maintenance module in FIG. 3. The virtual screen can be sized and resized as desired, and has a current limit of 32,000×32,000 virtual pixels. The tvtwm window manager has several advantages over the other virtual window managers, such as vtwm, in the support of the Virtual Screen concept. Tvtwm uses an additional window for the virtual desktop, while vtwm uses the actual root window. This allows tvtwm to move the "root" background with the client windows, providing a more intuitive Virtual Screen and less network traffic. The virtual screen system will function with any appropriately designed window manager.

The first demonstration of the concept, was a monocular prototype Virtual Screen that used a spatially coherent fiber optic cable with a resolution of 1000 by 800 picture elements imaging a full color workstation monitor with a resolution of 1280×1024 pixels. Low latency head tracking was provided by a 6-DOF servo-mechanical system developed by Shooting Star Technology in British Columbia, Canada. The window manager client and the head tracker communicated via shared memory. Subsequent demonstrations have used a full binocular prototype integrating the Virtual Screen software with a HCD (the BOOM 2C manufactured by Fake Space labs). The fiber optic cable and mechanical head tracker approximate the functionality of the HCD.

FIG. 4 shows a block diagram of the software modules comprising the Virtual Screen. Traditional input devices such as the keyboard 42 and mouse 44 are built into the X-server core for rapid update. Input devices such as sensors and Datagloves are interlaced through the X-extensions 40 for X-input and Xvideo. The current prototype interfaces the head tracker directly to the Virtual Screen 46, which then communicates the necessary position information to the underlying X windows code for update of the screen. This approach introduces some latency into the update of the current Virtual Screen view with the benefit of maintaining compatibility with future releases of X windows. The preferred low-latency method interfaces the head tracker directly to the lowest level of the window management system, which for X windows is the X-server.

A novel feature of the Virtual Screen is the wide range of new metaphors for both visualizing and interacting with data that it enables. A partial list of the types of metaphors that are possible with the Virtual Screen follows:

FOV Designate Windows: The user can designate a window to interact with by positioning the field of view within a particular window using the head tracker.

Look and Drag: A user can view numerous data sets spread out in multiple windows across the Virtual Screen. Typical examples are individuals layers of multi- and hyper-spectral images, demographics, political boundaries, and elevation data. To view a combination of these data sets a user simply centers their FOV on the window of interest, locks it to track the FOV boresight, and drags and stacks it on top of the window containing the data set it is to be combined with. This can be done as often as desired, each time combining the data sets with a chosen operation (typically Boolean).

Flip Through: Often with two dimensional spatial data sets there are too many correlations of interest to adequately display them in a two or even three dimensional representation. The Flip Through metaphor uses the stacking capability of the Look and Drag to set up a deck of separate but overlapping, spatially registered, data sets. By moving their head into and away from the Virtual Screen surface, with a pigeon-head like motion, the user can flip through the layers and observe correlations temporarily in their mind's eye. At any point in time, a particular layer may be designated for movement and be shuffled up or down transparently through the deck (with the same type of head motion) and stacked in a new location.

Zoom: The desire to view spatial data at various resolutions is accomplished via the natural Zoom metaphor. By designating the intention to zoom, a use can move their head closer to the Virtual Screen for finer resolution and more detail, or move their head back to see more of the spatial data at a coarser resolution. A similar Zoom metaphor exists for non-spatial data. By moving their head closer, the user indicates interests in more detail. For a spreadsheet this may mean viewing details on how an entry was calculated and associated notes. For textual data this would indicate a desire to see more detailed information or to extract references or footnotes. Other commands or methods of interaction may be substituted for head movement.

Pan: Often it is desirable to view spatial data represented by an area larger than the display or window it is being viewed in. This is accomplished by using neutral head movement.

Virtual DBs: By combining data sets with the "Look and Drag" metaphor and other conventional queries, it is possible to use remotely distributed heterogeneous databases to create virtual databases that exist only on the Virtual Screen and can be used for further queries or combined with other virtual databases.

In addition to the above spatial metaphors, temporal metaphors may also be exhibited using the Virtual Screen.

Calendar Metaphor: In order to restrict temporal data sets which span numerous weeks, months, or even years, to the period of interest, the calendar metaphor is used. This interface provides a series of full year calendars in which the user designates the desired range of time by using coordinated head, eye, voice, and/or pointing to drag start and stop icons over the appropriate days.

The current embodiment of the Virtual Screen uses only a head tracker and HMD or HCD as interface devices. A wide range of additional interaction methods that use combinations of head and eye tracking point and gesturing, voice, and 3D auditory icons are also available in the context of the X windows interface to the Virtual Screen.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A computerized data display system comprising:

a computer operating in accord with a window display management system for the display and control of a plurality of data windows on at least one display screen of at least one display device, said plurality of data windows being displayed in a non-overlapping manner on said at least one display screen in a spatial relation corresponding to a field of view seen from a preselected viewing location selected by means of a position control signal provided as an input to said computer;

a head coupled image display device, coupled to said at least one display screen of said at least one display device, for displaying said plurality of data windows appearing on said at least one display screen of said at least one display device separately to each eye of a user to create a binocular virtual screen image to the user that has a virtual screen size independent of the size of said at least one display screen of said at least one display device; and, user controlled input head position means coupled to said computer, the position means generating said position control signal as an input to said computer to selectively change said selected viewing location.

2. A computerized data display system as in claim 1 further including:

memory means coupled with said computer for retaining a plurality of data to be used by said computer for the generation and display of said plurality of data windows.

3. A computerized data display system as in claim 1 wherein said user controlled input position means comprises a head coupled head tracking position sensor means worn by the user on the user's head, said position sensor means generating said position control signal as an input to said computer to selectively change said selected viewing location based upon movement of the user's head.

4. A computerized data display system as in claim 3 wherein said head coupled head tracking position sensor means is a low latency head tracking sensor.

5. A computerized data display system as in claim 1 wherein said user controlled input position means offers the user six degrees of freedom of movement.

6. A computerized data display system as in claim 1 wherein said user controlled input position means comprises a data glove worn by the user, said glove generating said position control signal as an input to said computer to selectively change said selected viewing location based upon movement of the user's hand.

7. A computerized data display system as in claim 1 wherein said user controlled input position means comprises a head coupled eye tracking position sensor means worn by the user on the user's head, said position sensor means generating said position control signal as an input to said computer to selectively change said selected viewing location based upon movement of the user's eye.

8. A computerized data display system as in claim 1 wherein said head coupled image display device further displays said plurality of data windows separately to each eye of a user to create a binocular stereoscopic virtual screen image to the user.

9. A computerized data display system as in claim 1 wherein said head coupled image display device is a head mounted display.

10. A computerized data display system as in claim 1 wherein said head coupled image display device is a head mounted see-through display.

* * * * *